US008234627B2

(12) United States Patent
Floyd et al.

(10) Patent No.: US 8,234,627 B2
(45) Date of Patent: Jul. 31, 2012

(54) SYSTEM AND METHOD FOR EXPEDITING INFORMATION DISPLAY

(75) Inventors: Michel Floyd, Menlo Park, CA (US); Brian Spiegel, Menlo Park, CA (US)

(73) Assignee: Knowledge Networks, Inc., Menlo Park, CA (US)

( * ) Notice: Subject to any disclaimer, the term of this patent is extended or adjusted under 35 U.S.C. 154(b) by 1270 days.

(21) Appl. No.: 11/903,272

(22) Filed: Sep. 21, 2007

(65) Prior Publication Data

US 2009/0083704 A1  Mar. 26, 2009

(51) Int. Cl.
*G06F 9/44* (2006.01)
*G06F 9/45* (2006.01)
*G06F 15/16* (2006.01)

(52) U.S. Cl. ......... 717/115; 717/110; 717/140; 709/203

(58) Field of Classification Search .................. None
See application file for complete search history.

(56) References Cited

U.S. PATENT DOCUMENTS

| | | | |
|---|---|---|---|
| 5,754,787 A | 5/1998 | Dedrick | |
| 5,893,098 A | 4/1999 | Peters et al. | |
| 6,029,195 A | 2/2000 | Herz | |
| 6,064,980 A | 5/2000 | Jacobi et al. | |
| 6,070,145 A | 5/2000 | Pinsley et al. | |
| 6,098,048 A | 8/2000 | Dashefsky et al. | |
| 6,112,181 A | 8/2000 | Shear et al. | |
| 6,385,693 B1 | 5/2002 | Gerszberg et al. | |
| 6,397,212 B1 | 5/2002 | Biffar | |
| 6,477,504 B1 | 11/2002 | Hamlin et al. | |
| 6,513,014 B1 | 1/2003 | Walker et al. | |
| 6,532,458 B1 | 3/2003 | Chaudhuri et al. | |
| 6,539,392 B1 | 3/2003 | Rebane | |
| 6,542,886 B1 | 4/2003 | Chaudhuri et al. | |
| 6,571,216 B1 | 5/2003 | Garg et al. | |
| 6,697,824 B1 | 2/2004 | Bowman-Amuah | |
| 6,754,635 B1 | 6/2004 | Hamlin et al. | |
| 6,760,916 B2 | 7/2004 | Holtz et al. | |
| 6,772,139 B1 | 8/2004 | Smith, III | |
| 6,778,807 B1 | 8/2004 | Martino et al. | |
| 6,912,521 B2 | 6/2005 | Kraft et al. | |
| 6,999,987 B1 * | 2/2006 | Billingsley et al. | 709/203 |
| 7,054,828 B2 | 5/2006 | Heching et al. | |
| 7,233,908 B1 | 6/2007 | Nelson | |

(Continued)

OTHER PUBLICATIONS

Frank Nimphius, "ADF Design Fundamental—Using JavaScript in ADF Faces Rich Client Applications", Jul. 2011, An Oracle White Paper, Oracle Corporation, pp. 1-53 <http://www.oracle.com/technetwork/developer-tools/jdev/1-2011-javascript 302460.pdf>.*

(Continued)

*Primary Examiner* — Thuy Dao
*Assistant Examiner* — Ben Wang
(74) *Attorney, Agent, or Firm* — Brian K. Dinicola (57) ABSTRACT

Exemplary systems and methods for expediting information display on a user device are provided. In exemplary embodiments, a request for information is received. An application server then generates and provides source code for a web page containing the requested information. In exemplary embodiments, a removal module is returned with the source code for the first web page. The removal module is configured to remove unnecessary elements from subsequent source code in order to expedite loading and displaying of subsequent web pages on the user device. In some embodiments, the web page comprises a syndicated web page within a window of a main web page.

20 Claims, 7 Drawing Sheets

U.S. PATENT DOCUMENTS

| | | | |
|---|---|---|---|
| 7,269,570 B2 | 9/2007 | Krotki | |
| 7,343,417 B2 | 3/2008 | Baum | |
| 7,418,496 B2 | 8/2008 | Macey et al. | |
| 7,487,435 B2* | 2/2009 | Aviv | 717/115 |
| 7,599,956 B2* | 10/2009 | Kirkpatrick et al. | 717/115 |
| 7,788,212 B2 | 8/2010 | Beckmann et al. | |
| 7,865,873 B1* | 1/2011 | Zoellner et al. | 717/110 |
| 2001/0034647 A1 | 10/2001 | Marks et al. | |
| 2002/0016731 A1 | 2/2002 | Kupersmit | |
| 2002/0035568 A1* | 3/2002 | Benthin et al. | 707/102 |
| 2002/0038302 A1 | 3/2002 | Maeda | |
| 2002/0052774 A1 | 5/2002 | Parker et al. | |
| 2002/0077881 A1 | 6/2002 | Krotki | |
| 2002/0128898 A1 | 9/2002 | Smith, Jr. et al. | |
| 2003/0002490 A1 | 1/2003 | Wong et al. | |
| 2003/0014320 A1 | 1/2003 | Thompson et al. | |
| 2003/0088458 A1 | 5/2003 | Afeyan et al. | |
| 2003/0105870 A1 | 6/2003 | Baum | |
| 2003/0144899 A1 | 7/2003 | Kokubo | |
| 2004/0073476 A1* | 4/2004 | Donahue et al. | 705/10 |
| 2004/0133463 A1 | 7/2004 | Benderev | |
| 2004/0187090 A1* | 9/2004 | Meacham | 717/110 |
| 2005/0086587 A1* | 4/2005 | Balz | 715/505 |
| 2005/0216480 A1* | 9/2005 | Wefers et al. | 717/115 |
| 2006/0155513 A1 | 7/2006 | Mizrahi et al. | |
| 2007/0214239 A1* | 9/2007 | Mechkov et al. | 709/219 |
| 2008/0082394 A1 | 4/2008 | Floyd et al. | |
| 2008/0104025 A1* | 5/2008 | Dharamshi et al. | 707/3 |
| 2008/0177859 A1* | 7/2008 | Nickerson | 709/217 |
| 2008/0270412 A1* | 10/2008 | Udayasankar et al. | 707/10 |
| 2008/0313011 A1* | 12/2008 | Rose et al. | 705/10 |
| 2009/0083720 A1* | 3/2009 | Bohizic et al. | 717/140 |
| 2009/0249314 A1* | 10/2009 | Weerman | 717/140 |
| 2011/0029613 A1* | 2/2011 | Hedditch | 709/205 |
| 2011/0191407 A1* | 8/2011 | Fu et al. | 709/203 |

OTHER PUBLICATIONS

Matthijssen et al., "FireDetective: Understanding Ajax Client/Server Interactions", May 21, 2011, ACM, pp. 998-1000 <http://delivery.acm.org/10.1145/1990000/1985973/p998-matthijssen.pdf>.*

Bozdag et al., "A Comparison of Push and Pull Techniques for AJAX", 2007 IEEE, pp. 15-22 <http://ieeexplore.ieee.org/stamp/stamp.jsp?tp=&arnumber=4380239>.*

"Perception and Learning Analyzers," Columbia Information Systems, MSInteractive, 2 pp.

"A Brief Introduction to Sampling", http://web.archive.org/web/19990220032218/http://pyschology.ucdavis.edu/rainbow/html/Fact_sample.html, Mar. 4, 2005, pp. 1-7.

"Regional Sampling Methods/Environmental Sampling and Monitoring Primer", Heidi Christopher and Dottie Schmitt, http://ewr.cee.vt.edu/environmental/teach/smprimer/design/sample.html, Dec. 6, 2006, pp. 1-5.

Decision Analyst, Inc. Marketing Research and Consulting Services, http://web.archive.org/web/19991012125037/decisionanalyst.com/servindex.htm, Mar. 4, 2005, pp. 1-15.

"The Organization Health Report: An HR Metric to Mobilize Executives into Action", Joseph S. Fiorelli, Gretchen A. Alarcon, and Eileen Taylor, Kelly Human Resource Planning, vol. 21, No. 2, pp. 12-19, 1998, from Dialog File 15, Item 2, 2005.

"InterSurvey is Providing Polls on 2000 Election", Knowledge Networks, Inc. press release, http://www.knowledgenetworks.com, Dec. 14, 1999, pp. 1-4.

"OnPolitics—What Americans Think: Lights out for Traditional Polls?", Richard Morin, Washington Post, http://www.washingtonpost.com/wp-srv/politics/polls/wat/archive/wat051500.htm, May 15, 2000, pp. 1-3.

"Probability Definitions: Example # 1", http://web.archive.org/web/20001209052000/http://stat.wvu.edu/SRS/Modules/ProbDef/urn...html, Dec. 9, 2000, Nov. 18, 2005, pp. 1-2.

"Web Surveys, The Sequel", Allan Rivlin, National Journal, Oct. 20, 1999, http://www.knowledgenetworks.com, pp. 1-4.

"Sampling With Replacement and Sampling Without Replacement", http://www.web.archive.org/web/19990823060052/http://www.ma.utexas.edu/users/parker/sampling/repl.htm, Mar. 4, 2005.

"To Politically Connect, and Profitably Collect", Sarah Schafer, Washington Post, Dec. 13, 1999, http://www.knowledgenetworks.com, pp. 1-6.

"Listening to the Voice of the Employee", Ronald D. Snee, Quality Progress, vol. 28, Jan. 1995, pp. 91-95, from Dialog File 15, Item 3, 2005.

"Survey Sampling Methods", http://www.web.archive.org/web/20001003145831/http://www.statpac.com/surveys/sampling.htm, Dec. 6, 2006, pp. 1-2.

"Conducting a Survey", Paul White, http://www.cems.uwe.ac.uk/pwhite/SURVEY2/nodel.html, Dec. 6, 2006, pp. 1-4.

"Sudaan 7: Statistical Analysis Software for Complex Sample Designs", Robert A. Yaffee, http://www.nyu.edu/its/pubs/connect/archives/97summer/yaffeesudaan.html, Nov. 18, 2005, pp. 1-3.

"Perception and Learning Analyzers," Columbia Information Systems, MSInteractive, Sep. 14, 2000, 2 pp.

* cited by examiner

SYSTEM AND METHOD FOR EXPEDITING INFORMATION DISPLAY

BACKGROUND OF THE INVENTION

1. Field of the Invention

Embodiments of the present invention relate generally to expediting information display, and more particularly to expediting display of new content on web pages.

2. Description of Related Art

Conventionally, content is provided by a content provider over a network. In survey embodiments, surveys may be provided to survey participants via the Internet. Typically, the survey participants go to a website to access one or more surveys. The survey is then provided to a browser associated with each survey participant.

Bi-directional communication of HyperText Transfer Protocol (HTTP) traffic occurs during a survey process. HyperText Markup Language (HTML) source code is provided to the survey participant's browser which enables display of a survey page comprising one or more questions. The survey participant provides answer(s) to the one or more questions and submits the answer(s). The browser performs a form post and sends the answer(s) to a web server and/or application server providing the survey. Based on the answer(s), the application server determines a next set of one or more questions. The HTML source code is generated for the next set and sent back to the browser. This process continues until the survey is complete. Additionally, survey testers may also access surveys via a website or network connection in a similar manner.

Conventionally, the HTML source code returned by the application server will consist of code for an entire survey web page. That is the returned HTML source code will include body tags, form tags, and content. As a result, a full web page is loaded by the browser every time a next set of questions is provided even though only the content (i.e., the questions, themselves) may have changed.

An amount of time a survey participant is interested in responding to a survey is typically short. If a survey is too long, the survey participant may lose interest and stop responding. Thus, load time of a survey web page becomes an important factor for surveys that are longer in length. Additionally, as surveys are likely using "wizards" where a user has to go screen, the surveys may be tedious to test. Therefore, it is desirable to be able to reduce the load time of web pages and desirable to be able to navigate to different parts of a survey.

SUMMARY OF THE INVENTION

Embodiments of the present invention provide systems and methods for expediting information display on a user device. In exemplary embodiments, a request for information is received. The information may be associated, in some embodiments, with a survey. In other embodiments, the information is associated with a syndication web page. The request for the information may comprise a user's name and password or comprise a trigger indicator for new or additional information. Alternatively, for example, the survey may be accessed via a link in a survey invitation received by the survey participant.

An application server then generates and provides source code for each web page of the selected information. In one embodiment, the source code may comprise HTML source code. In exemplary survey embodiments, a survey engine of the application server will generate the source code based on survey subject matter and an edited survey template associated with the selected survey. The survey template may be generated via an editor.

In exemplary embodiments, a removal module is returned with source code for the first web page. The removal module is configured to remove unnecessary or redundant elements from subsequent source code in order to expedite building and displaying of subsequent web pages on the user device in situ, for example, without the appearance of a page being loaded. In an alternative embodiment, the removal module may not be needed if the source code is based on Extensible Markup Language (XML) formatted data which only consists of new content.

Upon a subsequent request for information, source code for the new information is received. Because many elements of the source code are redundant or unnecessary (e.g., repetitive of what has been received in the past such as headers and background elements), information display would be expedited if these elements are not reloaded onto a web page that already has such elements loaded. As such, the removal module will remove these redundant or unnecessary elements. What remains is the new content which is loaded onto the web page. In one embodiment, the web page comprises a syndication page comprised within a main web page.

DETAILED DESCRIPTION OF EXEMPLARY EMBODIMENTS

Embodiments of the present invention provide a system and method that allows faster web page loads by limiting the load/refresh to new content. In exemplary embodiments, portions of a web page that do not change (e.g., a header, background design, etc.) will not be reloaded by a browser. While some embodiments of the present invention will be discussed in connection to surveys, the present invention may be utilized in non-survey environments whereby only a portion of a web page needs to be updated. The present invention may also be applied to syndication in a window of a main web page whereby any new content is loaded into the window according to exemplary embodiments as described herein.

Figure 1:
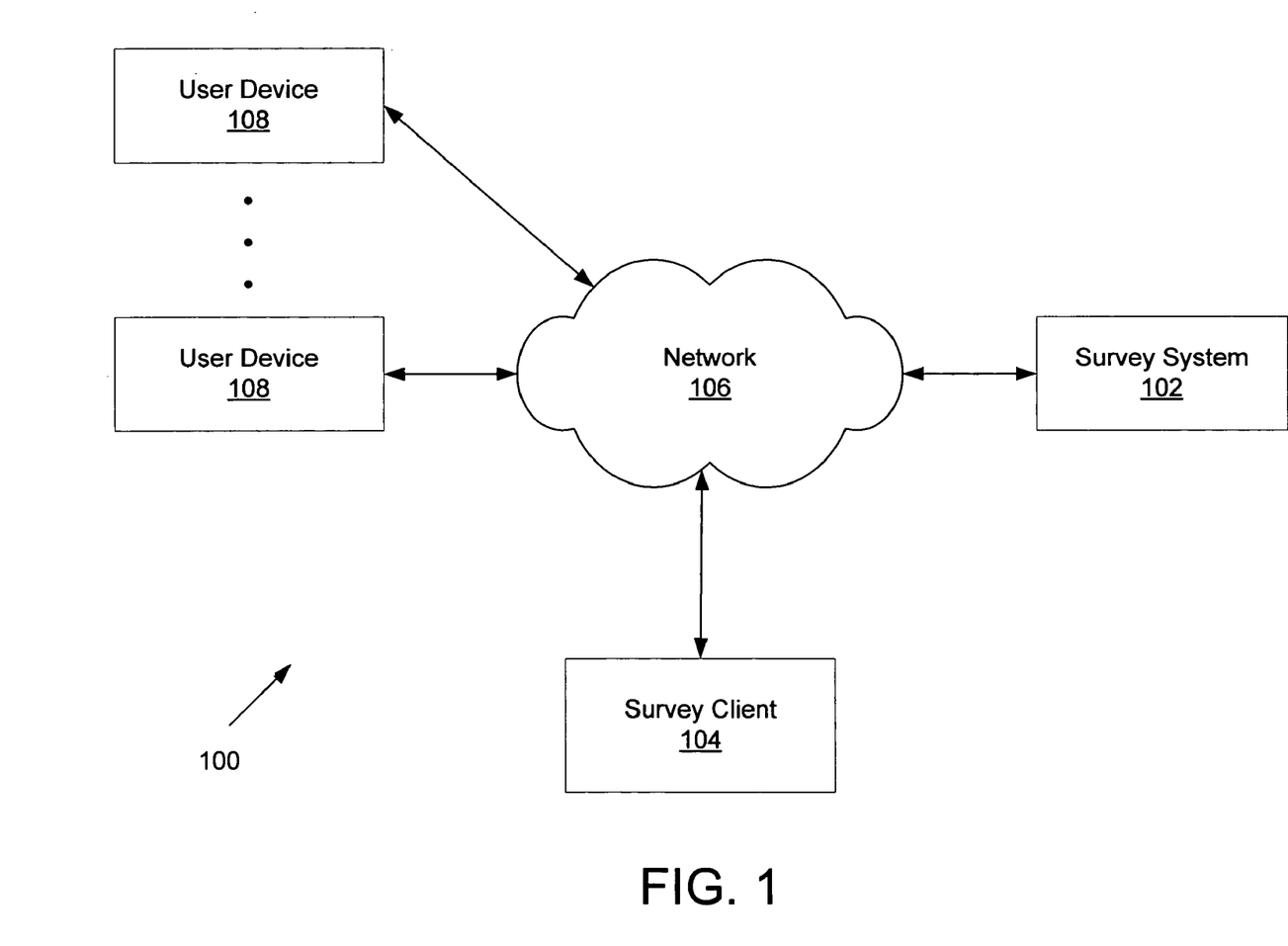
FIG. 1 is a diagram of an environment in which embodiments of the present invention may be practiced.

Referring to FIG. 1, an exemplary survey environment 100 in which embodiments of the present invention may be practiced is shown. The environment 100 comprises a survey system 102 configured to provide surveys based on information received from a survey client 104. The survey client 104 is an entity (e.g., business) that is interested in having some aspect of their product(s) or service(s) reviewed via a survey. In exemplary embodiments, the survey client 104 forms a relationship with a survey company associated with the survey system 102 such that the survey company will, based on information received from the survey client 104, generate the survey, determine an appropriate set of users (e.g., survey participants) to take the survey, and collect survey results. In some embodiments, the survey company may also test the survey. The survey company then provides the results to the survey client 104. Any number of survey clients 104 may be present in the environment 100.

In some embodiments, the survey client 104 interacts with the survey company via a network 106. The network 106 may comprise the Internet. In other embodiments, the survey client 104 and the survey company may interact via other networks 106 or communication means such as via telephone, in person, or the interaction may involve a combination of communication means.

A plurality of user devices 108 are also coupled to the survey system 102 via the network 106. In some embodiments, the user devices 108 are associated with a survey participant. In other embodiments, the user devices 108 are associated with a survey tester or reviewer. As such, the user device 108 may be associated with any user that wants to access a survey. The user device 108 may comprise a personal computer, mobile communication device, personal digital assistant, or any other type of computing device. Any number of user devices 108 may be present in the environment 100. In exemplary embodiments, the users access a website associated with the survey company. The users are identified by the survey system 102, and an appropriate survey is provided to a browser of the user device 108 associated with the user. In alternative embodiments, the user (e.g., a tester), and thus the user device 108, may be embodied within the survey company or survey client 104.

In exemplary embodiments of the present invention, a first survey web page (e.g., web page comprising survey questions) is entirely loaded onto the user device 108. Subsequent survey web pages may only load new content, as will be described in more details below.

Figure 2:
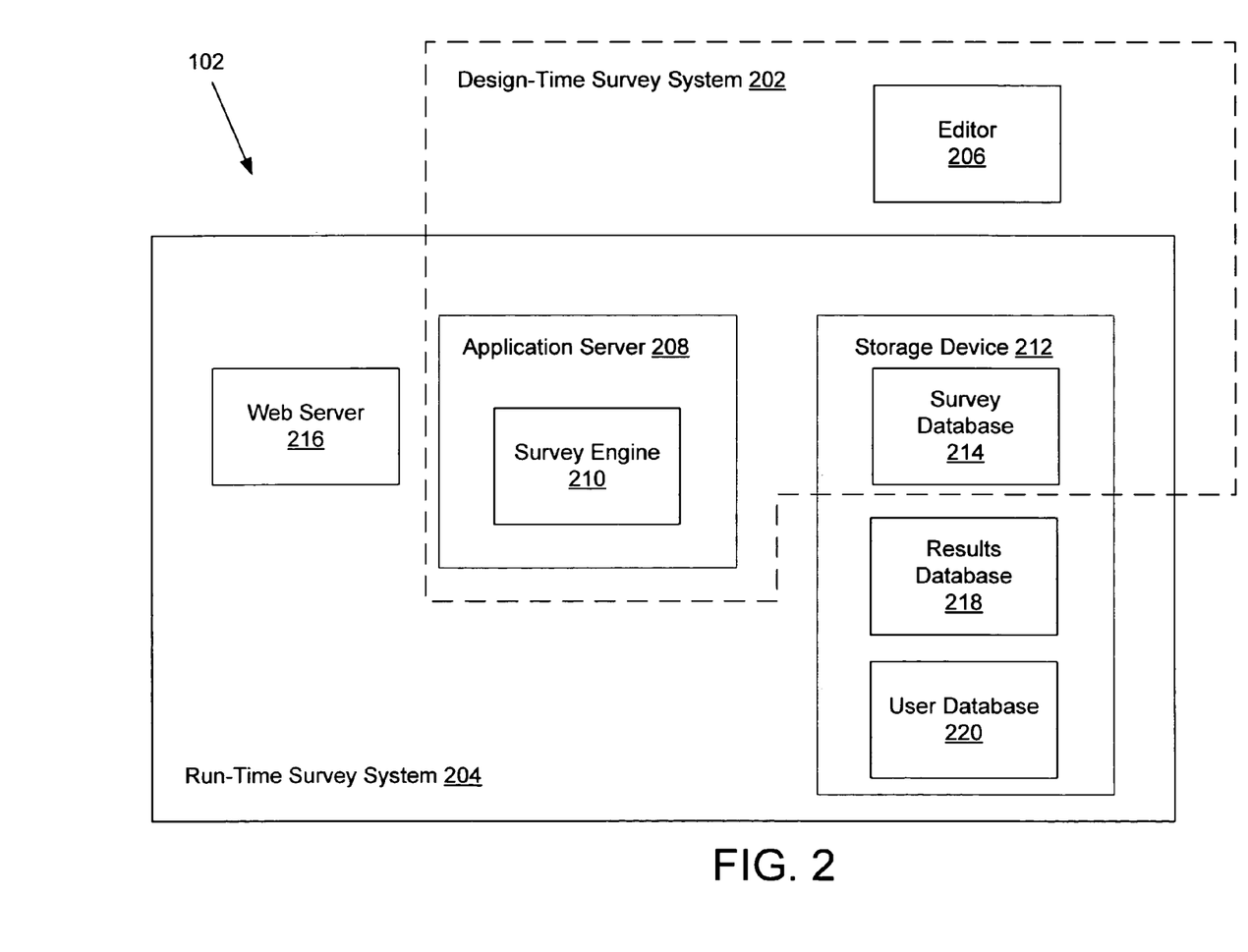
FIG. 2 is a block diagram of an exemplary survey system.

Referring now to FIG. 2, the survey system 102 is shown in more detail. In exemplary embodiments, the survey system 102 comprises a design-time survey system 202 and a run-time survey system 204. The design-time survey system 202 provides components used to create a survey. In contrast, the run-time survey system 204 provides components used to provide the created survey to users. These two survey systems 202 and 204 may share common components.

In exemplary embodiments, the design-time survey system 202 comprises an editor 206 and an application server 208. The editor 206 is configured to process survey content into a form of a survey template which is then provided to a survey engine 210 of the application server 208. According to one embodiment, the survey content is scripted, via the editor 206, into the survey template for use by the survey engine 210. The survey template may be stored in a storage device 212. The survey content may comprise questions for the survey based on data received from the survey client 104.

The editor 206 may also make updates to the surveys. In exemplary embodiments, the updates are made to the survey engine 210 which may then affect a survey database 214. Alternatively, the editor 206 may make updates directly to the survey database 214. These edits to the survey engine 210 or survey database 214 may comprise updates to the survey. For example, if a question is changed, an update to the survey database 214 may be made to edit columns to match the new questions. In exemplary embodiments, every column in the survey database 214 is associated with a question or a variable location.

The run-time survey system 204 comprises a web server 216, the application server 208 along with the survey engine 210 and the storage device 212. The storage device 212 may further comprise a results database 218 and a user database 220.

The exemplary web server 216 is configured to deliver web page content to browsers and other files to applications via, for example, a HTTP protocol. In some embodiments, the web server 216 may comprise software, and as such, may be a HTTP server (e.g., Internet Information Services (IIS), Apache, etc.) that manages requests from the browser and delivers HTML documents and files (e.g., HTML source code) in response. The web server 216 may also execute server-side scripts (e.g., Common Gateway Interface (CGI) scripts, JavaServer Pages (JSPs), Active Server Pages (ASPs), etc.). Alternative embodiments may utilize other protocols. While the following discussion is provided with respect to the use of HTML source code, alternative embodiments may utilize other source code formats.

In some embodiments, the web server 216 provides a removal module to the user device 108 which removes unnecessary or redundant portions of source code provided to the user device 108, so that only new content will be loaded onto subsequent web pages associated with the survey. In one embodiment, the removal module comprises an AJAX (Asynchronous JavaScript and XML) type module. Alternative embodiments may utilize other scripting language modules to remove redundant or unnecessary portions of the source code. In yet other embodiments, only new content is returned to the user (e.g., using XML).

The exemplary application server 208 is configured to host a variety of language systems used to program database queries and/or general processing. These scripts and services, such as JavaScript and Java server pages (JSPs), typically access databases in a storage device 212 to retrieve up-to-date data (e.g., a next set of one or more survey questions) to present to the user. The survey data may be stored in the survey database 214.

The exemplary survey engine 210 takes the survey content and survey template from the editor 206 and generates source code representing a web page, which is sent to the user upon request. The survey engine 210 may also receive responses from the user and store the responses in the storage device 212. Based on the responses, the survey engine 210 determines a next set of one or more questions to be provided to the user. The corresponding source code is then generated by the survey engine 210 for the next set of questions and forwarded to the user device 108 associated with the survey participant.

In some embodiments, the survey engine 210 may comprise a plurality of routing and logic which transforms the survey content received from the editor 206 into the source code. This source code may comprise coding which may not be necessary for the purpose of presenting a next set of questions as described in accordance with embodiments of the present invention. For example, if the background and header of the web page does not change from one web page to the next, then only new content (e.g., a new set of questions) needs to be loaded onto the web page in order to reduce load or refresh time. This process will be discussed in more detail below.

In some embodiments, the editor 206 and the survey engine 210 may be under the control of two different entities. For example, the editor 206 may be associated with the survey company, while the survey engine 210 may be associated with a survey services provider. In these embodiments, the survey company has no control as to the operation of the survey engine 210 or the output of the survey engine 210. As such, the survey company utilizes the editor 206 to develop templates that will enable the functionalities described in connection with embodiments of the present invention.

In an alternative embodiment, the survey engine 210 may comprise a logic driven survey engine 210 which outputs in an XML format. In some of these embodiments, a conversion of the XML output to HTML format may be required. For example, an Extensible Stylesheet Language Transformations (XSLT) processor may be utilized to transform the XML output of the survey engine 210 into HTML format for delivery to the user device 108. According to exemplary embodiments, the XML-based data consists only of the new content (i.e., there are no redundant elements).

The exemplary storage device 212 is configured to store data associated with surveys provided by the survey system 102. The survey database 214 comprises data associated with the survey and survey questions. In some embodiments, the survey database 214 may store the templates that are generated by the editor 206 and provided to the survey engine 210. The results database 218 may store answers to the surveys. In some embodiments, the results database 218 may include processed survey results. For example, the answers to a particular survey may be processed to provide an average and median score or result for each survey question.

The user database 220 comprises user information. The user information may be utilized to verify users (e.g., login data), determine which users should respond to a survey, and send an invitation to selected users, for example. Alternative embodiments may comprise other databases or combine databases (e.g., the survey database 214 and the results database 218).

Figure 3:
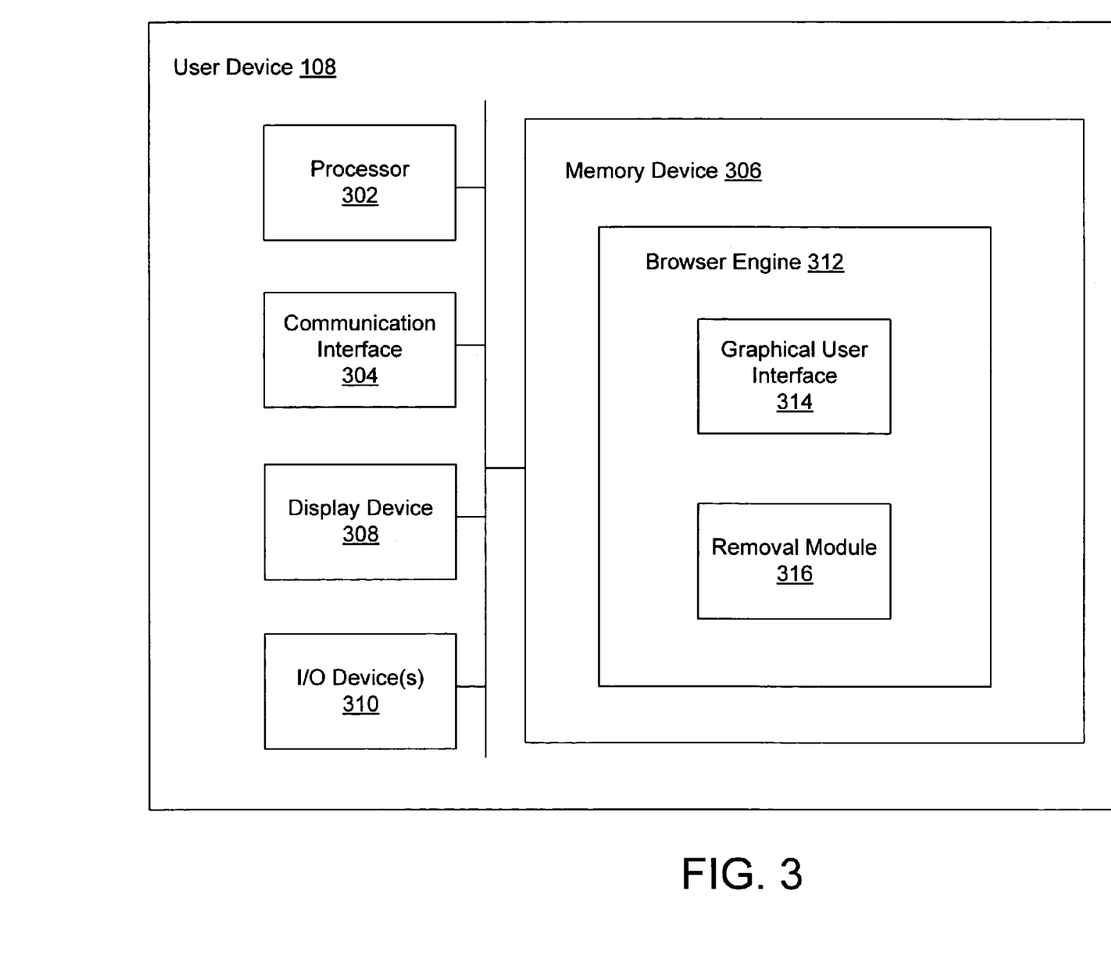
FIG. 3 is a block diagram of an exemplary user device.

Referring now to FIG. 3, a block diagram of the exemplary user device 108 is shown. The user device 108 may comprise a processor 302, a communication interface 304, and at least one memory device 306. The user device 108 further comprises other conventional components, such as a display device 308 and input and output devices 310. The communication interface 304 allows the user device 108 to communicate with the network 106. The memory device 306 may be any storage medium type, and may comprise a browser engine 312. The exemplary browser engine 312 may be any type of application or engine that allows the user device 108 to interact with the survey system 102 or any other content provider via the network 106.

The browser engine 312 may further comprise a graphical user interface 314 and a downloaded removal module 316. The exemplary graphical user interface 314 comprises a graphical user interface which is configured to provide a graphical representation of the survey to the display device 308 of the user device 108. The graphical user interface 314 may be further configured to receive inputs (e.g., survey answers/responses) from a user via the I/O devices 310. The browser engine 312 may comprise other conventional components necessary for the operation of the browser on the user device 108. These conventional components will not be discussed as one skilled in the art will understand these functionalities.

In exemplary embodiments, the removal module 316 is downloaded from the survey system 102 at a beginning of a survey or from a content provider with a first web page from the content provider. For example, the removal module 316 may be downloaded with a first web page associated with the survey. This first web page may be an introductory web page or a first web page of the survey. In some embodiments, the removal module 316 may comprise JavaScript. Alternative embodiments may comprise a removal module 316 using other forms of scripting language. In yet other embodiments, the removal module 316 may be provided from other sources or via other means such as a compact disc.

The exemplary removal module 316 is configured to intercept communications being exchanged between the browser engine 312 and the network 106. However, the browser engine 312, the web server 216, and/or the application server 208 function normally as if the removal module 316 is not present. Thus, when a user submits responses to a set of one or more survey questions, the removal module 316 intercepts the submit request and performs a POST operation while preventing the browser engine 312 from performing a POST itself.

In exemplary embodiments, the removal module 316 prevents the browser engine 312 from loading a completely new web page when only select content on the web page changes. The removal module 316 does this by intercepting the source code received from the survey system 102 or content provider, parsing the source code, and striping out portions of the source code that are not necessary or redundant for a subsequent web page. These unnecessary or redundant portions may comprise areas of the web page that do not change from one web page to a subsequent web page (e.g., header, background, etc.) and/or source code that is redundant.

In embodiments where a user stops a survey before completion, a save point is stored in the storage device 212. This save point comprises a marker that may return the user back to a previous point in the survey. By using a single survey template to present survey questions throughout the survey, the user may be returned to the save point in the survey including styling and format of non-changing portions of the web page.

Figures 4A, 4B:
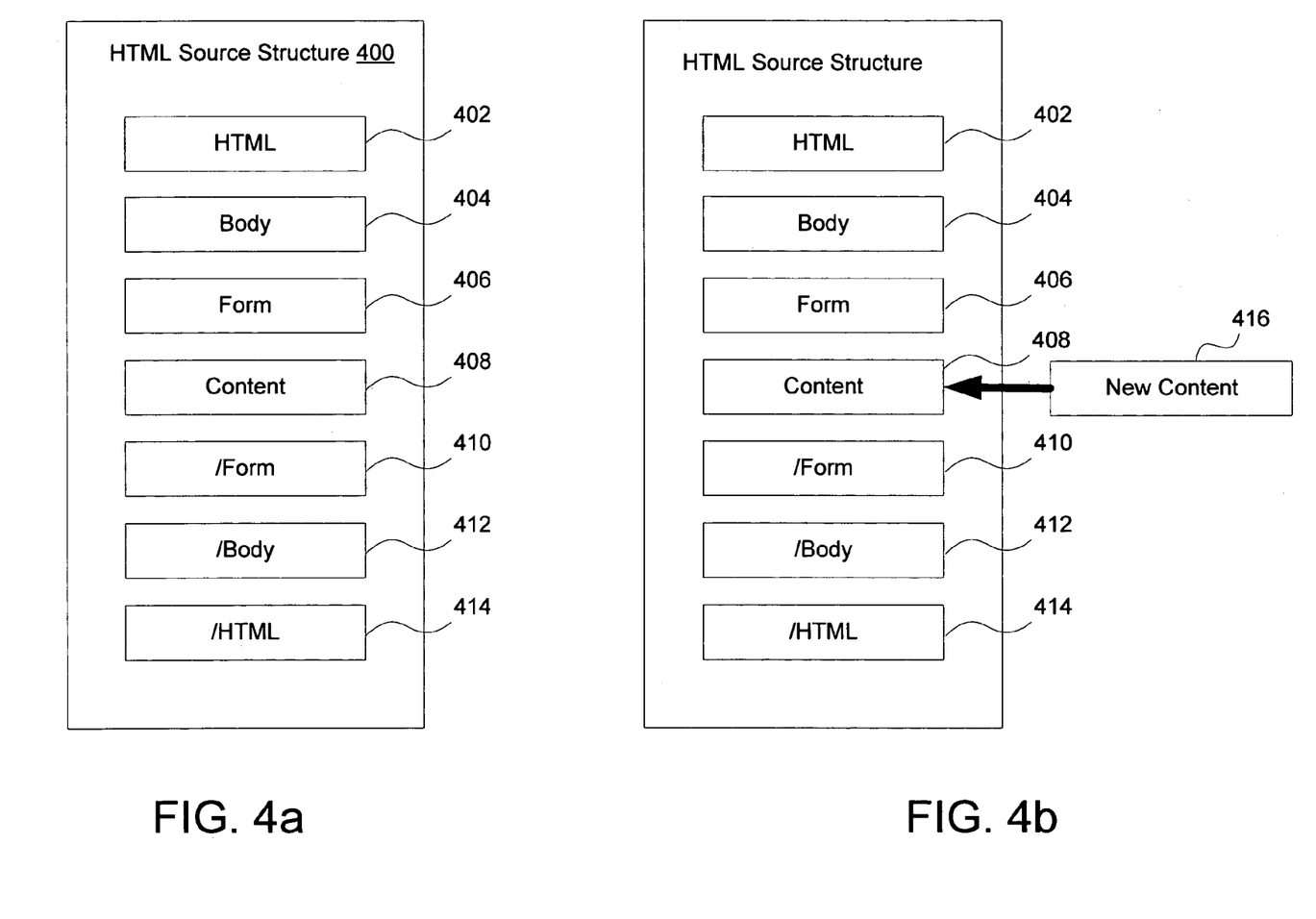
FIG. 4a is a block diagram of an exemplary HTML source structure, according to one embodiment.
FIG. 4b illustrates an operation of an embodiment of the present invention.

Referring now to FIG. 4a, an exemplary HTML source structure 400 is shown. The HTML source structure 400 represents the HTML source code that is loaded for each web page. As shown, the HTML source structure 400 comprises a HTML tag 402, a body tag 404, a form tag 406, content 408, a form closing tag 410, a body closing tag 412, and a HTML closing tag 414. One skilled in the art will understand the usage of these various tags 402, 404, 406 and closing tags 410, 412, and 414. As such, no further discussion will be provided with respect to these elements.

After the initial loading of the HTML source code for the first web page, subsequent web pages may only have a change in the content. As such, the tags 402, 404, 406 and closing tags 410, 412, and 414 are merely duplicates of the HTML source code of the first web page. Therefore, these repeated tags 402, 404, 406 and closing tags 410, 412, and 414 may be unnecessary in a load or refresh of the subsequent web page.

The exemplary removal module 316 is configured to intercept HTML source code of a subsequent web page, parse the HTML source code, and remove the unnecessary/duplicate elements of the HTML source code such that only new content (e.g., new content 416 of FIG. 4b) is loaded to create the next web page. In exemplary survey embodiments, the survey engine 210 will provide the same HTML source structure for each subsequent survey web page of the survey based on the survey template. With this knowledge, the removal module 316 may remove any duplicate elements prior to and including the form tag 406 and any duplicate elements after and including the form closing tag 410. What remains is the new content 416. This new content 416 may then be passed to the graphical user interface 314 which generates the next survey web page to display to the survey participant by replacing the previous content 408. As such, the graphical user interface 314 does not rebuild the entire HTML source structure of the subsequent survey web page, but limits the rebuild to the new content 416. Therefore, there is no browser refresh, and the associated time to load the next set of one or more questions is reduced.

While embodiments of the present invention have been described utilizing a removal module 316 for removing redundant elements from subsequent HTML source code, alternative embodiments may utilizing other source structures and other forms of remote scripting modules for removing redundant elements from the source structure.

In some embodiments, a transition effect may be utilized to display the next web page. By using transition effects, an interest level of the survey participant may be maintained. Additionally, the transition effect may make the load of the new content 416 less perceivable to the survey participant. Examples of transition effects include cover left/right, fade in/out, box in/out, and so forth. Any type of transition effect may be used in various embodiments of the present invention.

Figure 5:
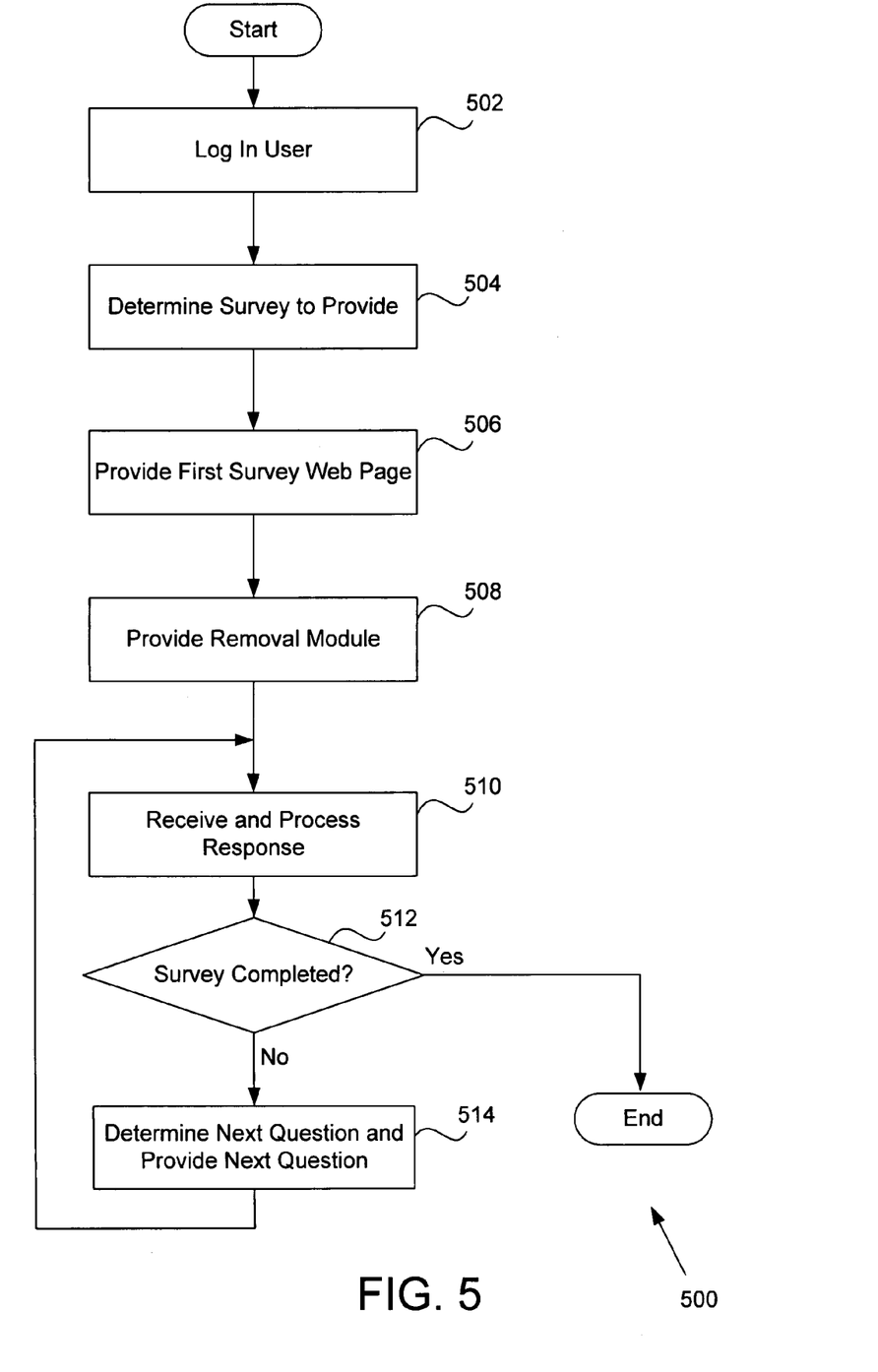
FIG. 5 is a flowchart of an exemplary method for providing a survey to a requesting user.

Referring now to FIG. 5, a flowchart 500 of an exemplary method for providing a survey to a user is shown. In step 502, the user is logged in with the survey system 102. In one embodiment, the user may provide a user name and password to log in with the survey system 102. In another embodiment, the user may access the survey system 102 via a link provided on a communication (e.g., survey invitation sent by the survey company via e-mail). In this embodiment, the user's identity may be determined based on the accessed link or information automatically returned when the link is activated.

In step 504, the survey system 102 determines which survey to provide the user. For example, upon receiving the user name and password from the user, the application server 208 may access the survey database 214 to determine which survey(s) the user is eligible to take or allowed to access. If more than one survey is applicable, the user may be asked to make a selection. In the embodiment where the user accesses the survey system 102 via the survey invitation link, the application server 208 may, via the link or information automatically returned, determine a specific survey to provide to the user.

A first survey web page is provided to the user device 108 associated with the user in the form of source code in step 506. In some embodiments, the first survey web page presents a first set of one or more questions to the survey participants. Along with the first survey web page, the removal module 316 may be provided by the web server 216 in step 508. In embodiments that utilize XML in order to provide updated content, the removal module 316 may not be needed. It should be noted that steps 506 and 508 may occur substantially simultaneous or in parallel.

In some embodiments, an introductory web page may precede the first survey web page. This introductory web page may comprise an explanation or purpose associated with the survey, thank the survey participants for their time and cooperation, and/or describe incentives for completing the survey. In these embodiments, the removal module 316 may be provided with the introductory web page. A next web page of the survey may then comprise the first set of questions (i.e., the first survey web page).

A response or a set of responses is then received from the user device 108 based on a current set of questions being displayed to the user in step 510. For example, if the first survey web page is currently being provided, then the response is for the first set of questions from the first survey web page.

A determination is made in step 512 as to whether the survey is completed. If the survey is not completed, then the survey engine 210 will determine a next set of one or more questions to present to the user in step 514. The next set of questions may be based on the received response or set of responses. Thus, the survey engine 210 utilizes logic to determine a next set of content based of a previous response. The survey engine 210 then provides the next set of one or more questions to the user, and waits for a next set of responses. The process is repeated until the survey is completed in step 512. In some embodiments, a last web page of the survey may comprise set up and content that differs from the survey web pages. For example, the last web page may present a thank you message or a survey complete message with a different style format than that of the survey web pages.

Figure 6:
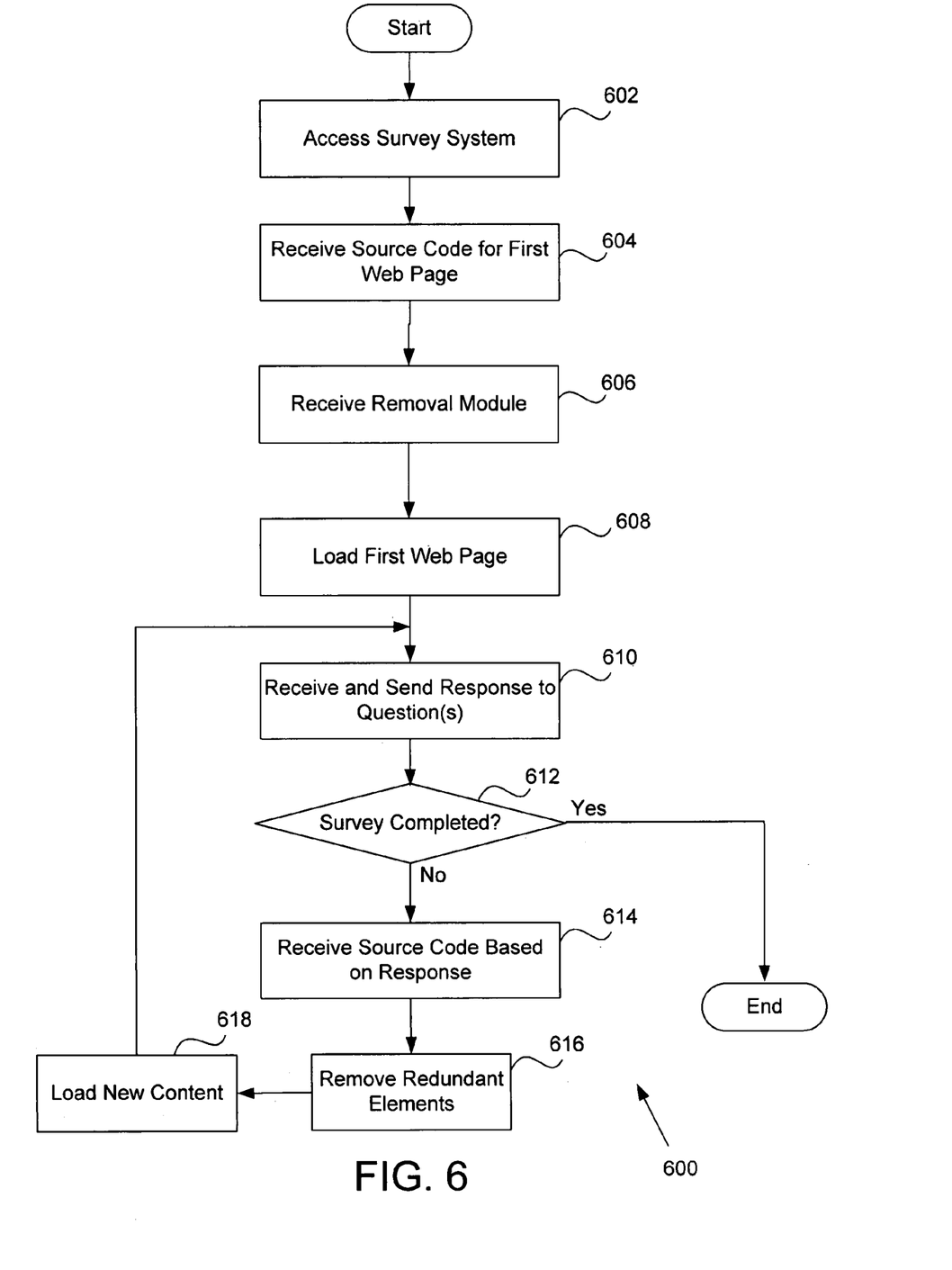
FIG. 6 is a flowchart of an exemplary method for providing the survey display on a user device.

FIG. 6 illustrates a flowchart 600 of an exemplary method for providing a survey display on the user device 108. In step 602, the user accesses the survey system 102. In one embodiment, the user may, via their user device 108, access a website associated with the survey company and provide a user name and password to log in with the survey system 102. In another embodiment, the user may access the survey system 102 via a link provided on a communication (e.g., e-mail) received from, for example, the survey company.

Upon determining a survey that the user is eligible to participant in or has permission to access, source code of a first survey web page is received by the user device 108 in step 604. In step 606, the removal module 316 is received at the user device 108. In some embodiments, steps 604 and 606 may occur in parallel, substantially simultaneously, or in reverse order. The removal module 316 may be stored in the memory device 306 of the user device 108 for subsequent usage during the survey process. In embodiments utilizing XML, the removal module 316 may not be needed.

In some embodiments, an introductory web page may precede the survey web pages. In these embodiments, the removal module 316 may be received with, or substantially simultaneous with, the introductory web page source code. If the style formatting of the introductory web page is different than that of the survey web page (e.g., different header, background, placement of content, etc.), then the introductory source code along with the source code for the first survey web page will both be fully loaded by the browser engine 312. If the only difference between the introductory web page and the survey web page is content, then the survey web page may be provided by implementing the expedited display process as discussed herein.

In step 608, the first survey web page may be graphically displayed to the user. In exemplary embodiments, the graphical user interface 314 processes the source code received from the survey system 102 and loads the entire first survey web page. As described in connection with FIG. 4a, the source code of the first survey web page may comprise a plurality of tags 402, 404, 406, content 408, and closing tags 410, 412, and 414. In some embodiments, the first web page comprises a set of one or more survey questions.

The user responds to the set of survey questions and submits the responses in step 610. In some embodiments, the removal module 316 will intercept the submit request and perform a post to the survey system 102.

If the survey is completed in step 612, then the process ends. However, if the survey is not completed, then the user device 108 will receive the next source code in step 614. The removal module 316 may intercept the next source code prior to the source code reaching the graphical user interface 314. In step 616, the removal module 316 will, according to the process described in connection with FIG. 4a and FIG. 4b, remove unnecessary or redundant elements from the source code. In exemplary embodiments, the removed elements may comprise various tags 402, 404, 406 and closing tags 410, 412, and 414. If the source code is based on XML data, then step 616 may not be needed since the XML data is configured to provide only the new content.

After the removal of unnecessary or redundant code/elements, the remaining content (e.g., new content 416) is provided to the graphical user interface 314. The graphical user interface 314 then builds a next survey web page with the new content 416 and provides the next survey web page to the survey participant in step 618. In some embodiments, the new content comprises the next set of questions of the survey. The survey process continues until the survey is completed in step 612.

In some embodiments, a last web page of the survey may comprise set up and content that differs from the survey web pages. For example, the last web page may present a thank you message or a survey complete message with a different style format than that of the survey web pages. In these embodiments, the removal module 316 may remove little or no elements from the source code, and the source code for this last web page may be fully loaded by the browser engine 312.

Figure 7:
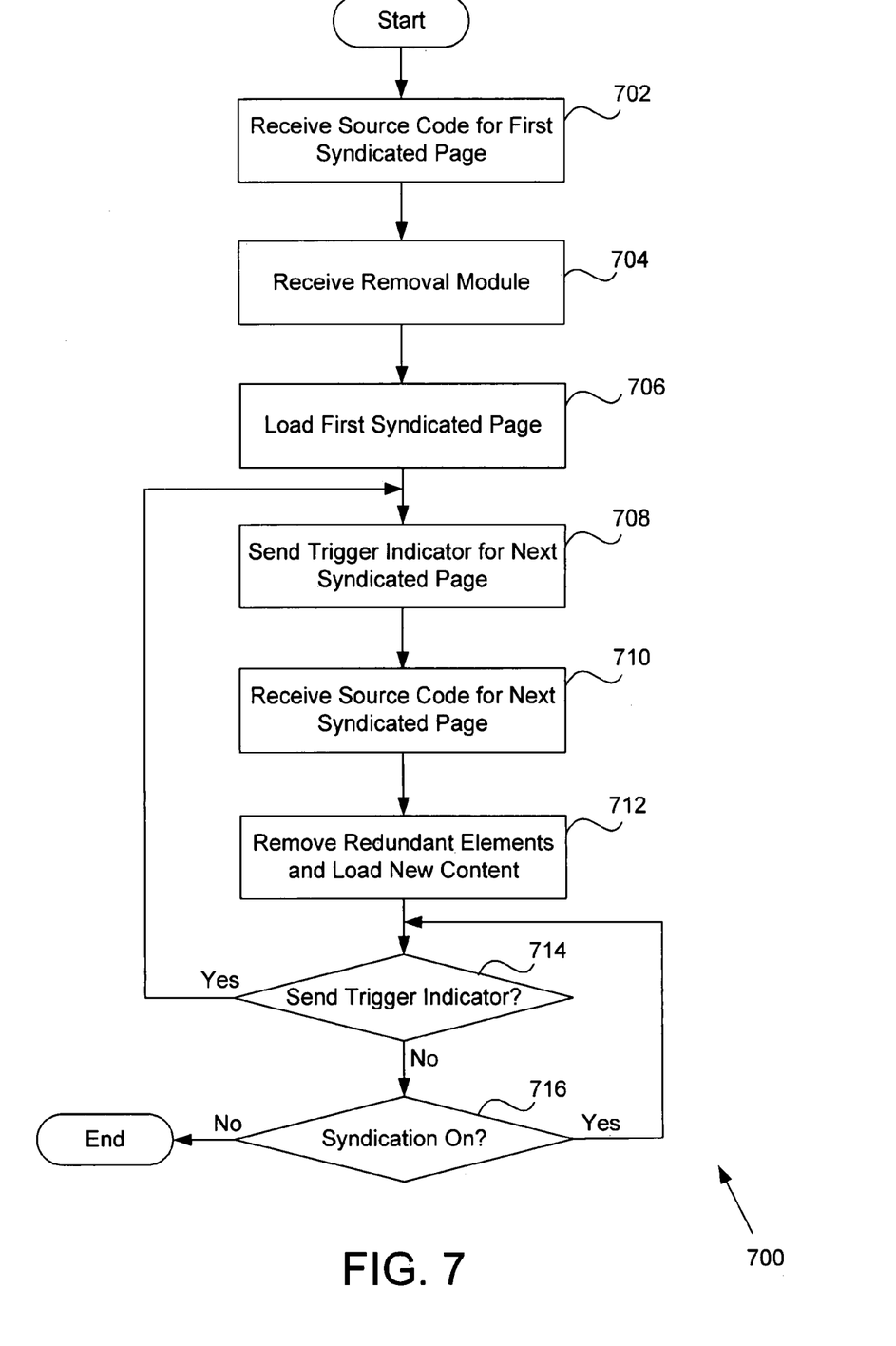
FIG. 7 is a flowchart of an exemplary method for providing syndicated information on the user device.

Referring now to FIG. 7, a flowchart 700 of an exemplary method for providing a syndicated page using embodiments of the present invention is provided. In step 702, source code for a first syndication page is received by the user device 108. In exemplary embodiments, the syndication page may be provided within a window of a main web page. The syndication page may provide a web page, content, or other information from a website or content provider that is different from the main web page. In one example, the source code for a first syndication page may be source code that contains or links to content from a content provider that is different from that of the main web page.

In step 704, the removal module 316 is received at the user device 108. In some embodiments, steps 702 and 704 may occur in parallel, substantially simultaneously, or in reverse order. The removal module 316 may be stored in the memory device 306 of the user device 108 for subsequent usage. In embodiments utilizing XML, the removal module 316 may not be needed. It should be noted that if the main web page also utilizes the expedited information display mechanisms of the present invention, then the removal module 316 may be provided to the user device 108 with source code for a first page of the main web page. In these embodiments, step 704 may be unnecessary.

In some embodiments, the removal module 316 may be retrieved from memory of the user device 108. In one example, a browser of the user device 108 may have previously visited a website that downloaded the removal module 316 to the user device 108. In various embodiments, prior to downloading the removal module 316, the browser may be instructed (e.g., by the downloaded source code) to determine if a removal module 316 had been previously downloaded and is available (e.g., in a cache). If the removal module 316 is available, the browser may be further instructed to determine if the removal module 316 is current (e.g., the correct version) and/or if the removal module 316 is the correct type (e.g., there may be multiple types of removal modules 316 which may work with different pages, web servers, software, and/or technologies).

In step 706, the first syndicated page is graphically displayed to the user. In exemplary embodiments, the graphical user interface 314 processes the source code received from the content provider and loads the entire first syndicated page. As described in connection with FIG. 4a, the source code of the first syndicated page may, for example, comprise a plurality of tags 402, 404, 406, content 408, and closing tags 410, 412, and 414.

In step 708, a trigger indicator is sent requesting a next syndicated page from the content provider. In some embodiments, the trigger indicator may comprise a manual request initiated by the user of the user device 108 for the next syndicated page. In other embodiments, the trigger indicator may comprise a request generated based on a predetermined amount of lapsed time. For example, the trigger indicator may be sent in order to update the syndicated page every ten minutes.

Based on the trigger indicator, source code for a next syndicated page is received from the content provider in step 710. The source code may comprise redundant or unnecessary elements with respect to a currently loaded syndicated page. As such in step 712, the removal module 316 will, according to, for example, the process described in connection with FIG. 4a and FIG. 4b, remove unnecessary or redundant elements from the source code. In exemplary embodiments, the removed elements may comprise various tags 402, 404, 406 and closing tags 410, 412, and 414. If the source code is based on XML data, then step 616 may not be needed since the XML data may be configured to provide only the new content.

After the removal of unnecessary or redundant code/elements, the remaining content (e.g., new content 416) is provided to the graphical user interface 314. The graphical user interface 314 then builds a syndicated web page with the new content and provides the next syndicated web page to the user.

In step 714, a determination is made as to whether another trigger indicator should be sent. For example, if a predetermined period of time has past or a user selects to manually send a trigger indicator (e.g., by the user selecting "reload" within the browser), then a next trigger indicator will be sent in step 708. The process continues until the syndication is inactivated in step 716.

In various embodiments, when first accessed by the user, only a portion of the syndication page may load. In one example, the source code for a main page may be loaded by a browser on the user device 108. The source code for the main page may include instructions to draw a window configured to contain content from another content provider (e.g., headlines from a news website). The source code may contain a link to content from the other content provider as well as the removal module 316. The browser may activate the link to download an entire web page (e.g., the syndication page) from the other content provider. The removal module 316 may then remove unnecessary or redundant elements from the downloaded web page (e.g., the source code of the web page) from the other content provider as described herein. The user interface 314 may display the main page and the remaining content of the web page from the other content provider within the window.

Those skilled in the art will appreciate that this process may work in conjunction with any kind of software or technology and is not limited to syndication. This process may be used with, but limited to, RSS feeds, network feeds, blogging, sports data, traffic information, video, images, audio, and news. Further, the removal module 316 may assist in displaying content or organizing information from any number of content providers on one or more web pages.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A computer-implemented method for expediting information display on a user device, comprising:
   receiving a first request for information from the user device;
   providing source code for a first entire web page associated with the first request for information to the user device;
   receiving a second request for information from the user device;
   providing source code for a second entire web page associated with the second request for information to the user device;
   wherein the second request is different from the first request;
   providing a removal module to the user device, the removal module configured to remove redundant elements from the source code for the second entire webpage in order to prevent a full web page load when only some content on the second web page has changed;
   removing redundant elements from the source code for the second entire webpage, leaving only new content of the second webpage; and
   presenting the new content of the second webpage.

2. The method of claim 1 wherein the redundant elements from the source code comprise tags and closing tags of the source code.

3. The method of claim 1 wherein the web page comprises a syndicated web page within a window of a main web page.

4. The method of claim 1 further comprising editing data into an information template which is used in generating the source code.

5. The method of claim 1 wherein the new content is associated with a survey and survey questions.

6. The method of claim 5 further comprising determining which survey to provide access based on user login information.

7. The method of claim 5 further comprising determining which survey to provide to the user device based on a link through which a user of the user device accesses the survey.

8. The method of claim 1 wherein the source code for the second entire webpage is based on a response received from the user device.

9. The method of claim 1 further comprising providing a transition effect between subsequent pages generated by the source code.

10. The method of claim 1 further comprising receiving a trigger indication to provide the source code for the second entire webpage.

11. The method of claim 1 wherein providing the source code for the second entire webpage comprises receiving a request for the source code for the second entire webpage based on a time out trigger.

12. The method of claim 1 wherein the source code comprises HyperText Markup Language source code.

13. A computer-implemented method for expediting information display on a user device, comprising:
    providing a first request for information by the user device;
    sending source code for a first entire web page associated with the first request for information to the user device;
    providing a second request for information by the user device;
    sending source code for a second entire web gage associated with the second request for information to the user device;
    wherein the second request is different from the first request;
    receiving a removal module by the user device, the removal module configured to remove unnecessary elements from the source code for the second entire webpage in order to prevent a full web page load when only some content on the second web page has changed;
    receiving source code for a second entire webpage, the source code for the second entire webpage comprising new content and associated with the user device;
    receiving source code for the second entire webpage, the source code having unnecessary elements removed, such that only the new content is loaded into the second web page without a full web page load; and
    displaying the new content of the second webpage.

14. The method of claim 13 further comprising providing a request for the source code for the second entire webpage.

15. The method of claim 14 wherein the request comprises a time out trigger based on a predetermined expiration of time.

16. The method of claim 14 wherein the request comprises a request for the new content based on a manual trigger by the user.

17. The method of claim 14 wherein the request comprises a response to one or more questions of a survey.

18. The method of claim 17 wherein the source code for the second entire webpage comprises a second set of one or more questions based on the response to the one or more questions of the survey.

19. The method of claim 13 wherein a syndicated web page comprises the source code for the second entire webpage.

20. A non-transitory machine readable storage medium having embodied thereon a program, the program having instructions operable by a machine for expediting information display on a user device, comprising:
    receiving a first request for information from the user device;
    receiving and loading source code for a first entire web page associated with the first request for information from the user device;
    receiving a second request for information from the user device;
    receiving and loading source code for a second entire web page associated with the second request for information from the user device;
    receiving a removal module from the user device, the removal module configured to remove unnecessary elements from the source code for the second entire webpage in order to prevent a full web page load when only some content on the second web page has changed;
    receiving source code for a second entire webpage, the source code for the second entire webpage comprising new content and associated with the user device;
    removing unnecessary elements from the source code for the second entire webpage such that only the new content is loaded into the second web page without a full web page load; and
    presenting the new content of the second webpage.

* * * * *